March 31, 1953     J. J. JACOBSON ET AL     2,632,962
EDUCATIONAL DEVICE
Filed April 11, 1951
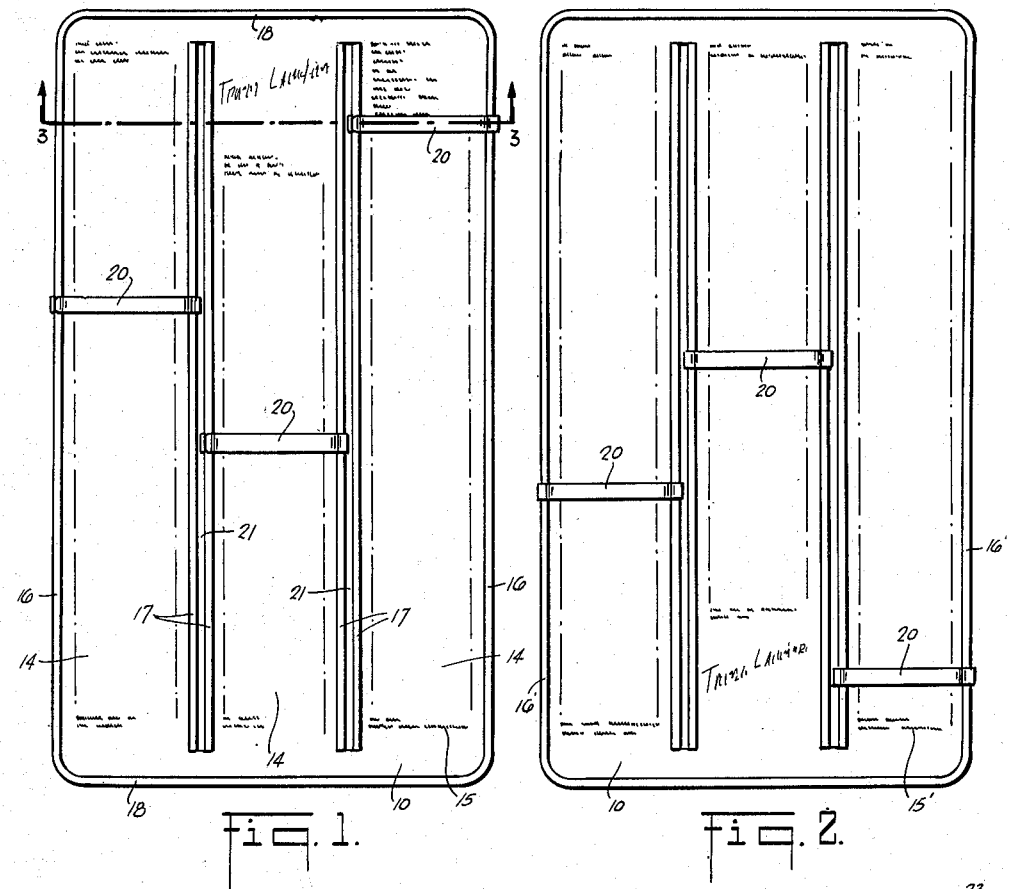
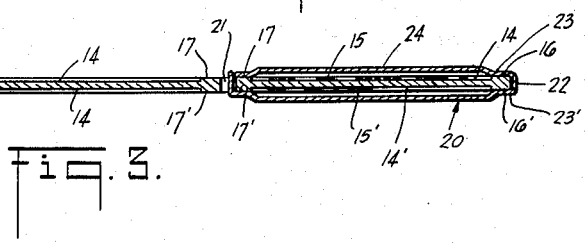
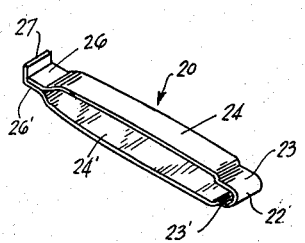
INVENTORS.
JAMES J. JACOBSON
JOHN G. KELJIKAN
BY
ATTORNEY Patented Mar. 31, 1953

2,632,962

UNITED STATES PATENT OFFICE 2,632,962

EDUCATIONAL DEVICE

James J. Jacobson, New York, and John G. Keljikan, New Rochelle, N. Y.; said Jacobson assignor to said Keljikan Application April 11, 1951, Serial No. 220,504

4 Claims. (Cl. 35—24)

This invention relates to educational charts or the like of the type having a slide movable thereover and, more particularly, to an improved arrangement of the indicia on such charts and an improved construction and mounting of the movable slide.

Charts of the type to which the present invention is applicable are used for such purposes as indicators, calculators, data selectors, and the like. Generally they comprise a flat element, either circular or rectangular, having indicia printed on one or both surfaces. One or more slides are movable over one or both surfaces to select and/or coordinate related data for information purposes.

The slides may be bars or rods serving to align the related indicia, or may be cases or covers having one or more selectively located openings to expose only the desired indicia. These slides may be movable bodily along the indicia carrying element, or may be pivoted thereto or rotatable thereon.

Among uses to which the charts are adaptable is that of translation aids. A translation chart may, for example, have words or phrases in one language printed on one face and corresponding words or phrases in a second language printed on the opposite face. The movable slides are so arranged that, when aligned with or exposing a word or phrase on one chart face, the corresponding word or phrase on the second face is aligned with or exposed by the slide. Thereby, with a known word or phrase in one language, the corresponding word or phrase in the second language is readily and quickly indicated.

All such movable slide charts, whether used as translation aids or for other purposes, have certain shortcomings as presently constructed. Due to the necessity of providing accurate indications, the movable slides must bear closely against the chart. As a result, after a certain amount of use, the indicia are worn away to such an extent as to be illegible. This is the case irrespective of the chart material, whether plastic, metal, paperboard, or other material.

This difficulty is avoided in a novel manner by the present invention. The chart surfaces carrying the printed indicia are recessed to provide marginal slide bearing surfaces bounding the indicia carrying recesses. The indicia may be printed flush with the recessed surfaces or may be engraved, embossed, etched, or the like, to project from the recessed surfaces. To further assure no contact with the indicia, the spring slide portions overlying the recesses may be offset outwardly from the bearing surfaces of the slides.

The recessed indicia surfaces with the bounding slide bearing and marginal surfaces may be formed in any desired manner. For example, if the chart is of plastic composition material, paperboard or the like, the recessed surfaces and bearing surfaces may be formed by pressure dies. The indicia may then be printed on the recessed surfaces, or the printing may be embossed thereon during the pressure die forming step. When the chart is metal, the indicia and the bearing and marginal surfaces may be printed on a metal plate with a tacky or adhesive ink. The plate surface is then sprinkled with acid resist powder which adheres to the inked areas. When etching acid is applied, the non-printed areas are etched to the desired depth leaving the raised indicia and the slide bearing and marginal surfaces. In this case, the slide portions overlying the printed areas are offset outwardly to clear the printing. The depressed areas defining the background may be painted or colored in any suitable manner.

For an understanding of the invention principles, reference is made to the following detailed description of a typical embodiment thereof as illustrated in the accompanying drawing. In the drawing:

Figs. 1 and 2 are elevation views of opposite surfaces of a translation chart embodying the invention;

Fig. 3 is a transverse sectional view on the line 3—3 of Fig. 1, looking in the direction indicated by the arrows; and Fig. 4 is a perspective view of one of the slides used with the chart.

Referring to the drawing, the chart 10 is illustrated as a translation aid having words or phrases in a first language on the surface illustrated in Fig. 1 and corresponding words or phrases in a second language on the surface illustrated in Fig. 2. The chart is divided, in the present case, into three parallel sections 11, 12 and 13, each having a slide 20 associated therewith. The three slides 20 are manipulated to underscore a complete sentence in the first language, and the chart 10 is inverted, end over end, to expose its opposite surface. The three slides underlie the corresponding complete sentence in the second language.

Each section 11, 12 or 13 comprises recessed areas 14, 14' bounded by marginal slide bearing surfaces such as 16, 17 and 18 and 16', 17' and 18' which project outwardly from the recessed areas. The slides 20, described more fully hereinafter, ride on surfaces 16, 17, being guided by the outer longitudinal edges of chart 10 and by slots 21, 21 between surfaces 17, 17. The recessed areas 14, 14' are printed with indicia 15, 15' forming the several words or phrases. In the present case, indicia 15, 15' are embossed or project from their corresponding areas 14, 14'.

As shown in Figs. 3 and 4, slides 20 are loop-shaped members formed by suitably bending a flat strip to form a bend 22, bearing areas 23, 23', offset intermediate indicating portions 24, 24', bearing areas 26, 26' and a hooked closing end 27. The hooked end 27 allows proper placement of the slide through slots 21. Bearing areas 23, 23', 26, 26' ride on surfaces 16, 16', and 17, 17', whereas portions 24, 24' overlie the recessed areas 14, 14'. The outward offset of portions 24, 24' effects suitable clearance of the raised indicia 15, 15'. The slides are preferably made of spring steel, so that the free ends thereof press firmly against each other with the hooked end 27 overlapping that portion thereof defining bearing area 36' to provide a closed loop, the slide for application to the chart being expanded from the initial position of Fig. 4 to enter through the slots of the chart as shown in Fig. 3 and then, upon contraction, forming the closed loop.

The recessed areas 14, 14', the slide bearing and marginal surfaces 16, 17, 18 and indicia 15, 15' are formed in the following manner: The opposite surfaces of the plate are first printed with an adhesive or tacky ink to form the indicia and outline the bearing and marginal surfaces. The surfaces are then coated with acid resist powder which adheres to the inked areas and is brushed off the printed areas 14, 14'. The plate is then dipped in etching acid which removes metal to the required depth from areas 14, 14', leaving the projecting indicia 15, 15' and the bearing and marginal surfaces 16, 17, 18. Pigment is applied to the surfaces and wiped from the projecting portions, thus coloring recessed areas 14, 14'. The projecting portions may then be colored a contrasting hue. Slides 20 are then mounted through slots 21 and over the side edges of the chart.

If the chart is plastic, paperboard, or the like, the recessed areas and portions 16, 17, 18 can be formed by die pressure. The indicia may be formed the same way or may be flat printed on the areas 14, 14'.

The recessing of the indicia areas 14, 14', plus the offsetting of slide portions 24, 24' prevents wear of the indicia due to slide movement. At the same time, bearing surfaces 16, 17 receiving slide areas 23, 26 provide firm bearing of the slides on the chart.

While a specific embodiment of the invention has been shown and described in detail to illustrate the application of the invention principles thereof, it should be understood that the invention may be otherwise embodied without departing from such principles.

What is claimed is:

1. An indicator device comprising, in combination, a substantially flat chart having cooperatively associated indicia carrying surface areas on opposite faces thereof, said surface areas being recessed from said opposite faces of the chart to provide bounding surfaces raised relative to said areas, and a slide movably mounted on said chart and having a portion extending over each of said surface areas for cooperation with the associated indicia thereon, said slide having bearing areas engaging said bounding surfaces and said slide portions being in spaced relation to said recessed areas.

2. An indicator device comprising, in combination, a substantially flat chart having cooperatively associated indicia carrying surface areas on opposite faces thereof, said surface areas being recessed from said opposite faces of the chart to provide bounding surfaces raised relative to said areas and said indicia being raised relative to said recessed areas, and a slide movably mounted on said chart and having a portion extending over each of said surface areas for cooperation with the associated indicia thereon, said slide having bearing areas engaging said bounding surfaces and said slide portions being offset outwardly relative to said bearing areas to clear said raised indicia.

3. An indicator device comprising, in combination, a substantially flat chart having a plurality of indicia carrying surface areas on both opposite faces of said chart, each of said plurality of surface areas being recessed from one face of the chart to provide bounding surfaces raised relative to said areas, and a plurality of slides movably mounted on said chart and each having portions extending over said opposite faces and different associated surface areas for cooperation with the indicia thereon, each slide having bearing areas engaging said bounding surfaces and said portions of each slide being in spaced relation to its associated recessed area.

4. An indicator device comprising, in combination, a substantially flat chart having a pair of indicia carrying surface areas each on a different face thereof and congruently juxtaposed, each of said surface areas being recessed from the corresponding face of the chart to provide bounding surfaces raised relative to the recessed areas and the chart having a slot extending along a bounding surface of each area, and a slide having a guiding section in the slot and parallel portions extending therefrom across the recessed areas for coordinating related indicia in the recessed areas, said slide having bearing areas engaging said bounding surfaces and said slide portions being in spaced relation to the recessed areas.

JAMES J. JACOBSON.
JOHN G. KELJIKAN.

REFERENCES CITED

The following references are of record in the file of this patent:

UNITED STATES PATENTS

| Number | Name | Date |
| --- | --- | --- |
| 729,955 | Murphy | June 2, 1903 |
| 1,522,328 | Rogers | Jan. 6, 1925 |
| 1,559,459 | Rogers | Oct. 27, 1925 |
| 1,611,604 | Martin | Dec. 21, 1926 |
| 1,903,778 | Conroy | Apr. 18, 1933 |
| 2,234,249 | Hanford | Mar. 11, 1941 |
| 2,554,445 | Corzilius | Mar. 6, 1951 |